United States Patent Office 3,247,012
Patented Apr. 19, 1966

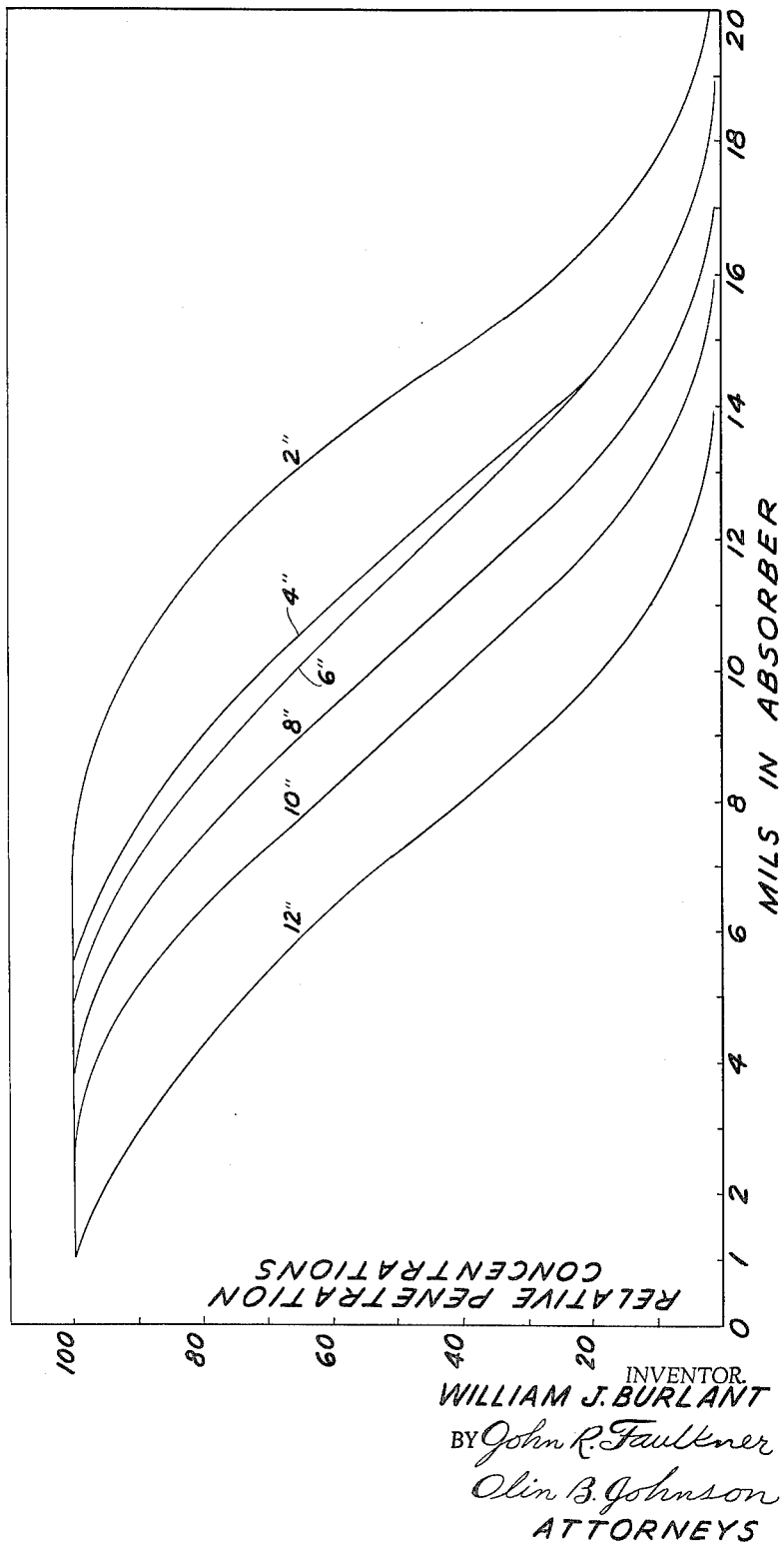

3,247,012
PROCESS OF COATING THE EXTERIOR SURFACE OF ARTICLES WITH A POLYMERIZABLE COATING MATERIAL SUBJECTED TO HIGH ENERGY IONIZING IRRADIATION
William J. Burlant, Detroit, Mich., assignor to Ford Motor Company, Dearborn, Mich., a corporation of Delaware
Filed May 1, 1963, Ser. No. 277,147
7 Claims. (Cl. 117—93.31)

This application is a continuation-in-part of application Serial Number 96,653, filed March 20, 1961 and now abandoned.

This invention relates to the field of coating and is specifically directed to a method for applying a durable and weatherproof coating to a substrate wherein a substantially solvent-free, film-forming, polymerizable coating material is cured in situ upon a substantially nonporous exterior surface of said substrate in a low temperature process with polymerization effecting electrons. More particularly, this invention relates to a method for controlling electron activated polymerization of a solvent-free, film forming resin on a relatively smooth, nonporous surface to effect substantially uniform curing of such films with depth and to provide an attractive coating of smooth and even finish.

Resin comprising, film-forming compositions which can be polymerized at low temperatures without resort to the use of the usual polymerization catalysts are available in the form of a flowable liquid which can be applied as a thin film to a substrate by conventional methods such as brushing, dipping, or spraying.

It is one object of this invention to provide a rapid, low temperature polymerization process whereby a nonporous substrate is provided with a durable, even coating polymerized in situ thereon by ionizing radiation in the form of mildly energetic electrons.

It is another object of this invention to provide a method whereby electron activated polymerization of a thin film of resin comprising material upon an essentially nonporous substrate is effected with substantial uniformity throughout the depth of the film without significant overcure of any portion thereof.

Other objects and advantages of the present invention will be apparent to those skilled in the art from the following descritpion taken in conjunction with the drawings in which:

FIGURE 3 is a graph of the type shown in FIGURE 1 using a beam potential of about 300,000 volts.

Figure 1:
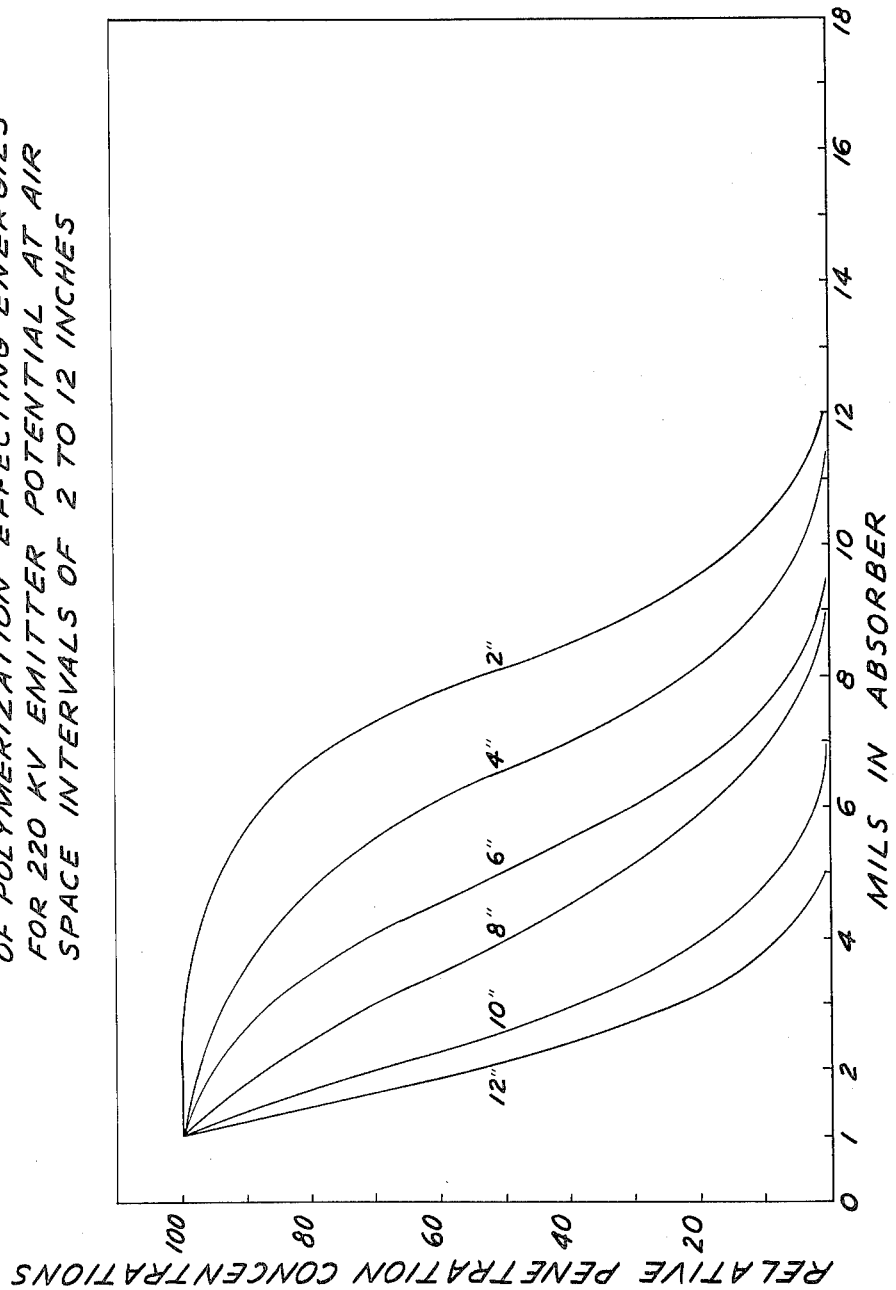
FIGURE 1 is a voltage-distance-depth graph illustrating the relative availability of electrons capable of effecting polymerization at different film depths from an electron beam having an average potential of about 220,000 volts with the electron emitting means spaced at various distances from the film.

An example of compositions particularly suitable for low temperature electron curing are free flowable liquids that include solutions of unsaturated polyesters in vinyl monomers, which upon copolymerization form cross linked coatings. These liquids are preferably substantially free of conventional solvents that separate from the film-forming material either during application to the substrate or during polymerization.

The unsaturated condensation polymers commonly known as alkyds become further cross-linked in the curing process and are particularly suitable for this process. They are formed of unsaturated acids having at least two carboxyl groups, and polyhydric alcohols. The alcohols most commonly used are ethylene glycol, propylene glycol, and glycerol. The acids may be maleic, fumaric, or other dibasic or tribasic acids or mixtures of acids some component of which provides the requisite unsaturation.

In special applications, wherein a softer coating is tolerable or desirable an unsaturated hydrocarbon polymer, e.g., polybutadiene, polyisoprene, etc., can be used in lieu of the polyester.

For many articles of manufacture having an exterior coating applied over a nonporous substrate it is essential that such coating be blemish-free and of smooth and even finish. In a rapid cure process the escape of solvents during polymerization can cause surface irregularities resulting in an article unacceptable in the market place. On the other hand, the entrapment of solvents is equally unacceptable where the presence of such solvents in the coating is incompatible with the production of a film of the desired physical properties. Thus, in the process of this invention it is preferred to obtain a free, flowable film through the use of a viscosity reducer, preferably a vinyl monomer, which in the polymerization process becomes an integral part of the resulting polymer, e.g. styrene, divinyl benzene, etc. Such materials and the low temperature cure employed permits the incorporation in the resin of heat labile chromogenic materials such as dyes and pigments and likewise the application of such films to heat labile substrates which cannot tolerate the elevated temperatures involved in the conventional methods of curing.

Polymerization of the film is initiated first in the outer portion or layer of the film, i.e. those portions first contacted by and nearer to the electron emitting means. If polymerization of the inner portions of the film, i.e. those portions nearer to the substrate, is insufficient the polymerized outer portions or layers will not be properly supported and the coating will be unacceptable. On the other hand, if there is a sufficient variance in polymerization rates at different film depths, an attempt to adequately cure the film at maximum depth can result in deleterious overcure of the outer portion and an undesirably brittle film.

It now has been discovered superior coatings can be obtained by establishing essentially uniform polymerization rates throughout the film and this can be achieved by using mildly energetic electrons and correlating the distance between film and emitting means with the potential of the electron beam. By this method substantial uniformity of polymerization with depth can be achieved at a dose rate compatible with rapid cures at low temperatures.

The term "mildly energetic electrons" as employed herein refers to electrons having an average potential of below about 450,000 volts and of sufficient potential to polymerize the resin-forming monomers at a rate at least equal to conventional heat polymerization processes for the same materials. Preferably, polymerization by this process is carried out at much faster rates than the conventional heat curing of paints. Ordinarily, the potential of the electron beam in this process will be maintained in the range of about 150,000 to about 450,000 volts. For most embodiments a potential in the range of about 200,000 to about 350,000 volts is preferred. These potentials are compatible with the use of flexible cables and other conventional electrical equipment.

Although not limited to films of this thickness as demonstrated in this specification and in the drawings, this invention is primarily concerned with the curing of films of less than about 3 mils in thickness, preferably films having an average thickness in the range of about 1 to about 2 mils. It is within the scope of this invention to alternately apply and cure successive thin films upon a given substrate, e.g. metal, wood, glass, synthetic polymeric solids, etc.

By varying the space between the electron source and the film in relation to the potential of the beam the difference in polymerization rates with depth can be minimized. With the aforementioned potentials it is preferred to maintain a minimum voltage of about 25,000 volts per inch separation between emitting means and the film to be cured. In accordance with this process the distance between emitting means and the film on the workpiece can be varied from about 2 feet to the minimum clearance compatible with the contours of the workpiece. Ordinarily a space range of about 2 to about 18 inches will be most efficient. The correlation of space distance with emission potential becomes increasingly important with an increase in either space distance or film depth. At the closer spacings voltages in the lower portion of the range can be successfully employed. Higher voltages permissible throughout this range become necessary at the greater separation distances to provide the desired uniformity of polymerization rates with depth. When operating in the range of about 200,000 to 300,000 volts spacings in the range of about 2 to about 12 inches are preferred.

Hence, in accordance with this invention the minimum variance in polymerization rates with depth is most desired. Although the tolerance to overexposure will vary somewhat with film composition, the time required to effect substantially complete polymerization of the film at its maximum depth ordinarily should not be greater than twice the time required to polymerize the most easily polymerized portion of the film. Preferably, this time is less than 1.5 times the period required to obtain the first polymerization.

The physical properties of the coating as well as its appearance are enhanced by avoiding an appreciable rise in temperature during polymerization. One of the advantages of the process is adaptability for use at normal room temperatures or lower, thus permitting curing of coatings upon articles which are formed of heat sensitive materials, e.g. plastics, rubber, glass, or have such materials installed therein or thereon. The temperature of the film should be insufficient to cause significant evaporation of the most volatile component thereof both before and during polymerization. Keeping within these limitations dose rates in the range of about 0.01 to about 15, preferably 0.1 to 10/megarad./sec. have been found suitable.

The term "Rad." as employed herein means that dose of radiation which results in the absorption of 100 ergs of energy per gram of absorber, i.e. coating film.

This invention will be more fully understood by referring to the following illustrative examples.

*Example 1*

Coating formulations suitable for use with this invention were prepared from the following components:

| | | |
|---|---|---|
| Maleic anhydride | mole | 0.10 |
| Phthalic anhydride | do | 0.20 |
| Propylene glycol | do | 0.30 |
| Styrene | | [1] 15–60 |

[1] Percent by weight of total formulation.

To the glycol at 100° were added the two anhydrides. The temperature was raised to 250° over a period of about 1 hour and kept at this temperature until the acid number fell to below 50 (56 hours; acid number=meq. KOH ×56.1/wt. sample). After this time the mixture was cooled to about 50° C. and the styrene was added. Dry pigment in the amount of about 15% of the total composition was added and thoroughly mixed with the formulation.

Other film-forming compositions were prepared containing in place of the propylene glycol, glycerol; in place of the above named unsaturated anhydrides, 4-cyclohexene-1, 2-carboxylic anhydride, chloromaleic anhydride; and in place of the styrene, divinyl benzene, acrylonitrile and triallyl cyanurate.

The foregoing compositions were brushed, sprayed and dip coated on test panels so as to provide a film of about 1.5 to about 2 mils in thickness and cured by an electron beam at potentials ranging from about 200,00 volts to about 300,000 volts at unit dose rates of about 0.1 to 10 megarad./sec. A typical curing time for a 4" x 12" test panel requiring a total dose of about 1 megarad. was about 7–8 seconds. The films were cured at distances from the electron emitting means, e.g. 2" to 6".

The electron emitting means employed in the tests was a linear electron accelerator capable of producing a direct current potential of about 300,000 volts. In such device electrons emitted from a hot filament are accelerated through a uniform voltage gradient. The electron beam, which is about ⅛" in diameter at this point, is then scanned in one direction to make a fan-shaped beam. The electron beam is then passed through a 0.003" metal window. This particular window was a magnesium-thorium alloy.

*Example 2*

Tests were conducted to determine the relative availability of electrons having polymerization effecting energy at varying depths with changes in beam potential and changes in air space between the emitting means and the workpiece.

Figure 2:
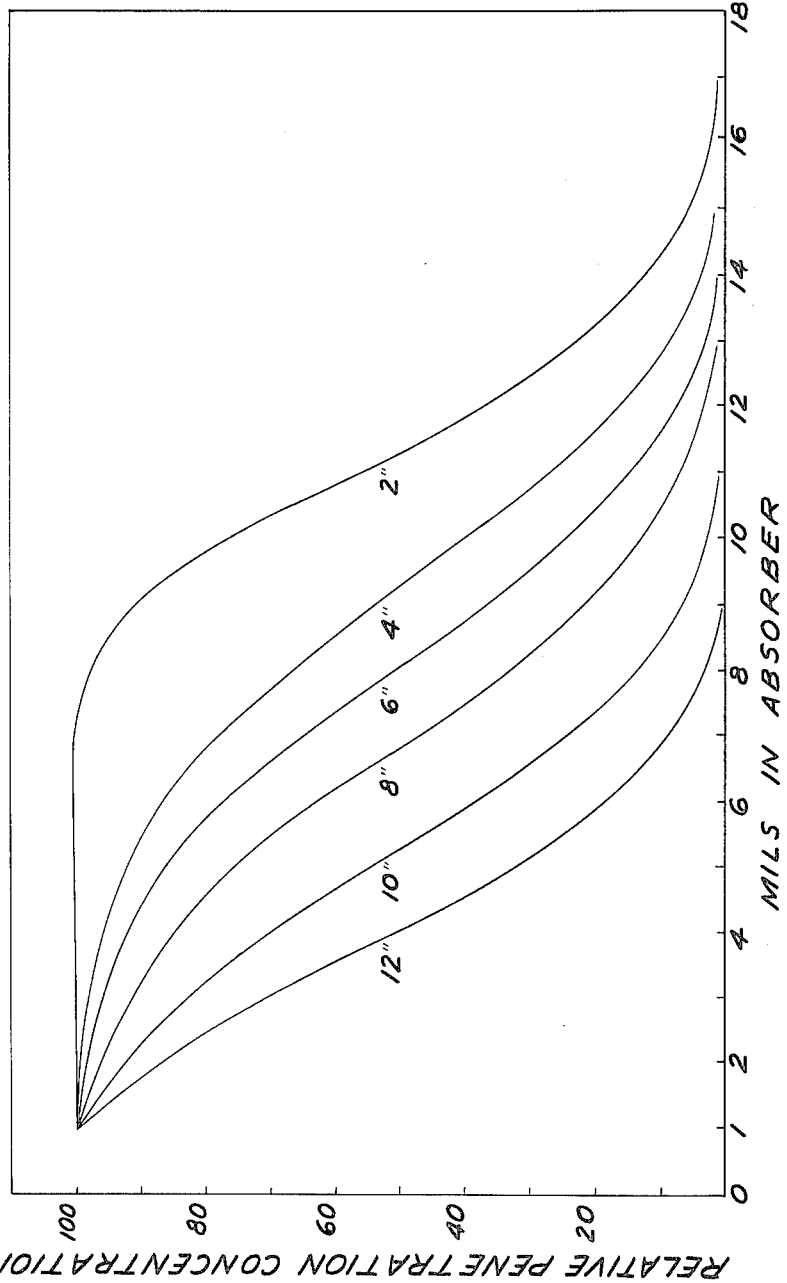
FIGURE 2 is a graph of the type shown in FIGURE 1 using a beam potential of about 260,000 volts.

The tests were made using superimposed layers of colored cellophane sheets adapted to change color upon exposure to polymerization effecting electrons. Separate tests were made with the emitting means providing potentials of about 220,000; 260,000; and 300,000 volts at distances ranging from about 2 to about 12 inches. After each exposure the layers of cellophane were separated and the degree of discoloration at various depths recorded. The relative loss of energy with depth per unit time under the varying conditions is illustrated in FIGURES 1 through 3 of the drawings.

The foregoing examples are solely for purposes of illustration and should not be considered as limitations upon the true scope of the invention as set forth in the following appended claims. Attention is directed to application, Serial No. 277,076 and application, Serial No. 277,077, both filed May 1, 1963, as continuation-in-part applications of application, Serial No. 96,653, filed March 20, 1961, of which the instant application is a continuation-in-part.

I claim:

1. In a method for applying a continuous coating to the exterior surface of an article of manufacture wherein a free flowable, polymerizable coating material is applied as a liquid film to said surface and polymerized in situ thereon by passing through said film a beam of polymerization effecting electrons from electron emitting means spaced apart therefrom, the improvement which comprises the combination of (a) maintaining said emitting means spaced apart from said film a distance of less than about 24 inches,
   (b) maintaining the average potential of said beam at a minimum of about 25,000 volts per inch of said distance and within the range of about 150,000 to about 450,000 volts,
   (c) maintaining an electron dose rate to said film from said beam that is insufficient to cause significant vaporization of the most volatile component of the unpolymerized polymerizable coating material in said film,
   (d) limiting polymerization rate variation with coating depth by adjusting said potential and said distance in direct relation to each other to a distance-potential combination which provides an electron dose rate to the depths of said film which varies not more than a factor of 2 between that portion of said film nearest said emitting means and that portion of said film farthest removed from said emitting means, and (e) terminating exposure of said film to said beam after said film has been exposed to said beam for a time greater than the time period required to effect polymerization of that portion of said film nearest said emitting means and not substantially greater than twice said time period.

2. In a method for painting the exterior surface of an article of manufacture wherein a free flowable, polymerizable coating material is applied to said surface as a film of less than about 3 mils in average depth to said surface and polymerized in situ thereon by passing through said film a beam of polymerization effecting electrons from electron emitting means spaced apart therefrom, the improvement which comprises the combination of (a) maintaining said emitting means spaced apart from said film a distance in the range of about 2 to about 18 inches, (b) maintaining the average potential of said beam at a minimum of about 25,000 volts per inch of said distance and within the range of about 150,000 to about 450,000 volts, (c) maintaining an electron dose rate to said film from said beam in the range of about 0.01 to about 15 megarad. per second, said rate being insufficient to cause significant vaporization of the most volatile component of the unpolymerized polymerizable coating material in said film, (d) limiting polymerization rate variation with coating depth by adjusting said distance within the distance range of (a) and said potential within the potential range of (b) in direct relation to each other to a distance-potential combination which effects polymerization of said film at its maximum depth within less than twice the time lapse required to effect polymerization of said film at its minimum depth, and (e) terminating exposure of said film to said beam after said film has been exposed to said beam for a time greater than the time period required to effect polymerization of said film at its minimum depth and less than twice said time period.

3. A method in accordance with claim 2 wherein said distance is in the range of about 2 to 12 inches and said potential is in the range of about 200,000 to about 300,000 volts.

4. A method in accordance with claim 2 wherein said dose rate is in the range of about 0.1 to about 10 megarad. per second.

5. A method in accordance with claim 2 wherein exposure of said film to said beam is terminated after said film has been exposed to said beam for a time greater than the time period required to effect polymerization of said film at its minimum depth and less than 1.5 times said time period.

6. In a method for painting the exterior surface of an article of manufacture wherein the binder fraction of said paint consists essentially of a solution of an unsaturated polyester resin in vinyl monomers which is essentially free of nonpolymerizable solvent and said paint is applied to said surface as a film of less than about 3 mils in average depth to said surface and polymerized in situ thereon by passing through said film a beam of polymerization effecting electrons from electron emitting means spaced apart therefrom, the improvement which comprises the combination of (a) maintaining said emitting means spaced apart from said film a distance in the range of about 2 to about 18 inches, (b) maintaining the average potential of said beam at a minimum of about 25,000 volts per inch of said distance and within the range of about 150,000 to about 450,000 volts, (c) maintaining an electron does rate to said film from said beam in the range of about 0.01 to about 15 megarad. per second, said rate being insufficient to cause significant vaporization of the most volatile component of the unpolymerized polymerizable coating material in said film, (d) limiting polymerization rate variation with coating depth by adjusting said distance within the distance range of (a) and said potential within the potential range of (b) in direct relation to each other to a distance-potential combination which effects polymerization of said film at its maximum depth within less than twice the time lapse required to effect polymerization of said film at its minimum depth, and (e) terminating exposure of said film to said beam after said film has been exposed to said beam for a time greater than the time period required to effect polymerization of that portion of said film nearest said emitting means and not substantially greater than twice said time period.

7. In a method for painting the exterior surface of an article of manufacture wherein the binder fraction of said paint consists essentially of a solution of an unsaturated polyester resin in vinyl monomers which is essentially free of nonpolymerizable solvent and said paint is applied to said surface as a film of less than about 3 mils in average depth to said surface and polymerized in situ thereon by passing through said film a beam of polymerization effecting electrons from electron emitting means spaced apart therefrom, the improvement which comprises the combination of (a) maintaining said emitting means spaced apart from said film a distance in the range of about 2 to about 12 inches, (b) maintaining the average potential of said beam at a minimum of about 25,000 volts per inch of said distance and within the range of about 200,000 to about 300,000 volts, (c) maintaining an electron does rate to said film from said beam in the range of about .01 to about 15 megarad. per second, said rate being insufficient to cause significant vaporization of the most volatile component of the unpolymerized polymerizable coating material in said film, (d) limiting polymerization rate variation with coating depth by adjusting said distance within the distance range of (a) and said potential within the potential range of (b) in direct relation to each other to a distance-potential combination which effects polymerization of said film at its maximum depth within less than 1.5 times the time lapse required to effect polymerization of said film at its minimum depth, and (e) terminating exposure of said film to said beam after said film has been exposed to said beam for a time greater than the time period required to effect polymerization of that portion of said film and less than 1.5 times said time period.

References Cited by the Examiner
UNITED STATES PATENTS

| | | | |
|---|---|---|---|
| 2,863,812 | 12/1958 | Graham | 204—154 |
| 2,921,006 | 1/1960 | Schmitz et al. | 117—93.31 |
| 3,065,157 | 11/1962 | Busse | 204—154 |
| 3,088,791 | 5/1963 | Cline et al. | 204—154 |
| 3,097,960 | 7/1963 | Lawton et al. | 117—93.31 |
| 3,101,275 | 8/1963 | Cairs et al. | 204—154 |
| 3,133,828 | 5/1964 | Slatkin | 117—93.31 |

SAMUEL H. BLECH, *Primary Examiner.*

MURRAY TILLMAN, *Examiner.*